United States Patent [19]

Marshall et al.

[11] 4,293,460

[45] Oct. 6, 1981

[54] POLYAMIDE YARN SPIN FINISH CONTAINING A REARRANGED GLYCERIDE AND OXIDIZED POLYETHYLENE

[75] Inventors: Robert M. Marshall, Chester; Kimon C. Dardoufas, Richmond, both of Va.

[73] Assignee: Allied Chemical Corporation, New York, N.Y.

[21] Appl. No.: 146,588

[22] Filed: May 5, 1980

[51] Int. Cl.³ .................... D06M 13/10; D06M 16/00
[52] U.S. Cl. ................................ 260/18 PF; 252/8.6; 260/23 H; 260/23 EP; 264/210.3
[58] Field of Search ....................... 264/210.3; 252/8.6; 260/18 PF, 23 H, 23 EP

[56] References Cited

U.S. PATENT DOCUMENTS

| | | | |
|---|---|---|---|
| 3,560,382 | 2/1971 | Finch | 252/8.9 |
| 3,563,892 | 2/1971 | Cooley | 252/8.7 |
| 3,687,721 | 8/1972 | Dardoufas | 252/8.6 |
| 3,785,973 | 1/1974 | Bernholz et al. | 252/8.8 |
| 3,846,532 | 11/1974 | Kubitzker et al. | 264/210.3 |
| 3,850,658 | 11/1974 | Gomez et al. | 428/357 |
| 3,917,893 | 11/1975 | Marshall et al. | 428/395 |
| 3,928,401 | 12/1975 | Sturwold et al. | 260/410.7 |
| 3,970,569 | 7/1976 | Sturwold et al. | 252/49.3 |
| 4,129,507 | 12/1978 | Marshall et al. | 252/8.9 |
| 4,191,656 | 3/1980 | Marshall | 252/8.6 |

OTHER PUBLICATIONS

Research Disclosure, Nov. 1976, p. 48, item 15146.
Research Disclosure, May, 1977, p. 19, item 15747.
Research Disclosure, Mar. 1978, item 16765
Research Disclosure, Aug. 1978, p. 5, item 17216.

*Primary Examiner*—Ronald W. Griffin
*Attorney, Agent, or Firm*—Virginia S. Andrews

[57] ABSTRACT

An aqueous spin finish, a process for treating polyamide yarn therewith and polyamide yarn so treated are all disclosed. The oil portion of the spin finish comprises a rearranged glyceride, ethoxylated oleyl alcohol, ethoxylated nonyl phenol, ethoxylated castor oil, an oxidized polyethylene, a non-nitrogen nonionic emulsifier for the oxidized polyethylene, and an alkali hydroxide. The spin finish has a pH of about 7 to 12. The spin finish has improved thermal stability which results in lower emissions during treatment of tire cord formed from polyamide yarn treated with the spin finish. Cord to rubber adhesion is also improved.

49 Claims, No Drawings

POLYAMIDE YARN SPIN FINISH CONTAINING A REARRANGED GLYCERIDE AND OXIDIZED POLYETHYLENE

BACKGROUND OF THE INVENTION

1. Field of the Invention

The present invention relates to an aqueous spin finish, a process for treating polyamide yarn therewith and to polyamide yarn treated therewith. The spin finish has improved thermal stability which results in lower emissions during treatment of tire cord formed from polyamide yarn treated with the spin finish. Cord to rubber adhesion is also improved.

2. Description of the Prior Art

Many of the known spin finishes for polyamide yarn flash off during high temperature processing of the yarn or cord formed therefrom. Others cause excessive loss of strength during cording operations. Still others fail to have emulsion stability or provide insufficient yarn lubrication.

Representative prior art patents include U.S. Pat. Nos. 3,103,448 to Ross; 3,428,560 to Olsen; and 3,560,382 to Finch. Spin finishes for polyamide yarn which include an oxidized polyethylene are disclosed in U.S. Pat. Nos. 3,917,893 to Marshall et al. and 4,129,507 to Marshall et al. A spin finish for polyamide yarn which includes an effective amount of a biocide, preferably 2[(hydroxymethyl)amino] ethanol, is disclosed in U.S. Pat. No. 4,191,656 to Marshall. Other prior art patents of interest are U.S. Pat. Nos. 3,113,369 to Barrett et al.; 3,470,095 to Pontelandolfo and 3,785,973 to Bernholz et al.

None of the prior art teaches the required combination of ingredients to achieve the specific beneficial results of the spin finish of this invention.

SUMMARY OF THE INVENTION

The present invention provides an aqueous spin finish, (oil in water emulsion), a process for treating polyamide yarn therewith and to polyamide yarn treated therewith.

The oil portion of the spin finish comprises a rearranged glyceride, ethoxylated oleyl alcohol, ethoxylated nonyl phenol, ethoxylated castor oil, an oxidized polyethylene, a non-nitrogen nonionic emulsifier for the oxidized polyethylene, and an alkali hydroxide. The pH of the spin finish ranges from 7 to 12, more preferably from about 7.3 to 9.7. The preferred weight percents of the components of the oil portion are as follows: about 24.7 to 65, more preferably about 39 to 60, weight percent of the rearranged glyceride; about 5 to 30, more preferably about 15 to 25, weight percent of ethoxylated oleyl alcohol wherein the ethoxylated oleyl alcohol contains about 6 to 12, more preferably about 8 to 10, moles of ethylene oxide per mole of oleyl alcohol; about 1 to 10, more preferably about 2.5 to 5, weight percent of ethoxylated nonyl phenol wherein the ethoxylated nonyl phenol contains about 2 to 12, more preferably about 5 to 10, moles of ethylene oxide per mole of nonyl phenol; about 5 to 30, more preferably about 10 to 20, weight percent of ethoxylated castor oil wherein the ethoxylated castor oil contains about 2 to 16, more preferably about 4 to 7, moles of ethylene oxide per mole of castor oil; about 1 to 7.4, more preferably about 2.5 to 6, weight percent of the oxidized polyethylene; about 0.2 to 2.0, more preferably about 0.5 to 1.7, weight percent of the emulsifier for the oxidized polyethylene; and about 0.04 to 0.3, more preferably about 0.08 to 0.15, weight percent of the alkali hydroxide. The oil portion comprises about 10 to 35, more preferably about 18 to 22, weight percent of the spin finish. As will be detailed later, it is preferred that an aqueous emulsion of the oxidized polyethylene, emulsifier and alkali hydroxide be combined with an aqueous emulsion of the other components.

Suitable oxidized polyethylene materials preferably have an acid number of about 14 to 32 and a ring and ball softening point of about 100° to 142° C. The ring and ball softening point is determined according to the procedure described in ASTM E-28 and will be referred to in the accompanying specification and claims as the softening point of the oxidized polyethylene. The most preferred oxidized polyethylene has an acid number of about 14 to 18 and a softening point of about 105° to 110° C. Another suitable oxidized polyethylene has an acid number of about 28 to 32 and a softening point of about 138° to 142° C. The preparation of such oxidized polyethylenes is described in Canadian Pat. No. 854,778, issued Oct. 27, 1970, hereby incorporated by reference. See also U.S. Pat. Nos. 3,060,163 to Erchak, Jr., 3,103,448 to Ross, 3,917,893 to Marshall et al., and 4,129,507 to Marshall et al., hereby incorporated by reference.

The rearranged glyceride is preferably derived from coconut oil, a natural triglyceride rich in $C_{12}$ lauric acid chain. The coconut oil is transesterified with glycerol trioleate. This results in a triglyceride rich in $C_{18}$ unsaturated oleic acid chain. The iodine value is a maximum of 55, this value being a measure of the extent of unsaturation in an organic compound by reaction of iodine across the double bond. This may also be accomplished by alcoholysis using oleyl alcohol in the presence of an acid catalyst. See U.S. Pat. No. 3,785,973 to Bernholz et al.

In this specification and accompanying claims, the phrase "rearranged glyceride" means a triglyceride rich in the $C_{18}$ unsaturated oleic acid chain. This triglyceride can be formed by either of the above-mentioned methods, i.e., alcoholysis using oleyl alcohol in the presence of an acid catalyst or transesterification of coconut oil with glycerol trioleate.

Any suitable non-nitrogen nonionic emulsifying agent may be used in emulsifying the oxidized polyethylene used in the present invention. Mixtures of higher fatty acids, for example $C_{12}$ to $C_{20}$ saturated aliphatic acids, may be used as emulsifiers as may also the alkyl aryl polyether alcohols. Especially useful are the condensation products of ethylene oxide with hydrophobic material such as a long chain aliphatic alcohol, acid, ester, ether or alkyl phenol. These products are characterized by containing as the hydrophilic portion of the molecule, a plurality of oxyethylene moieties as illustrated in the formulae below.

1. $R-O-(CH_2-CH_2O)_x-CH_2-CH_2OH$ wherein R is an alkyl group having from 12 to 22 carbon atoms or an alkyl phenol residue wherein the alkyl group contains from 6 to 13 carbon atoms inclusive and wherein X is at least 4, especially between about 6 and about 40. Commercial examples of products in this group include "Triton X-100" wherein R is an alkyl phenol residue wherein the alkyl group is isooctyl and wherein X is 7 to 9; "Triton X-102" wherein R is an isooctyl phenol residue and X is 11; "Tergitol NPX" wherein R is ethylhexyl phenol residue and X is 8 to 9; "Neutronic 600"

wherein R is nonyl phenol residue and X is 9; "Emulphor ELN" wherein R is dodecyl phenol residue and X is 19.

2. Condensation products of fatty acids and polyethylene glycols having the general formula: RCOO-$(CH_2CH_2O)_xCH_2CH_2OH$ wherein R is a long chain alkyl group having from 12 to 18 carbon atoms inclusive and X is an integer from 8 to 40 inclusive.

3. Polyoxyethylene derivatives of hexitol anhydride or sorbitol fatty acid esters such as "Tween 80".

4. Polyoxyethylene ethers R-O$(CH_2CH_2O)_xCH_2CH_2OH$ wherein R is an alkyl group having from 6 to 18 carbon atoms and X is an integer from 4 to 40 inclusive. The preferred emulsifiers are the alkyl phenols, most especially Triton X-100.

Alkali hydroxides suitable for use in the present invention include sodium hydroxide, potassium hydroxide and ammonium hydroxide, most preferably the former. The alkali hydroxide, preferably in solution, neutralizes the acid function of the polymer, i.e., the oxidized polyethylene, and is critical in making the polyethylene emulsion and consequently, the spin finish.

It is preferred that the spin finish of the present invention further comprises a biocide. Any biocide is satisfactory that does not lower the pH of the spin finish below about 7; at a pH of below about 7, the spin finish becomes unstable and the polyethylene wax plates out or deposits on the processing equipment. The pH of the spin finish which contains the biocide may range from about 8 to 10, more preferably about 9.1 to 9.4. When a biocide is utilized, it may comprise about 0.02 to 0.5, more preferably from about 0.05 to 0.15, weight percent of the spin finish. Various biocides for control of bacteria in spin finish emulsions used on polyamide yarn are disclosed in U.S. Pat. No. 4,191,656 to Marshall, hereby incorporated by reference; the biocide constituting a part of that invention, 2[(hydroxymethyl)amino] ethanol, is the preferred biocide for use in the spin finish of the present invention, if a biocide is to be used.

The present invention further provides a polyamide yarn treated with the spin finish composition as above defined. The present invention also provides, in a process for the production of polyamide yarn, the improvement which comprises treating the yarn during spinning with an aqueous spin finish as above defined. It is preferred that approximately 0.01 to 2.0 weight percent, based on the weight of the yarn, of the oxidized polyethylene be retained on the yarn.

The strip adhesion test utilized in illustrating the present invention is defined in U.S. Pat. No. 3,940,544 to Marshall et al., hereby incorporated by reference.

The test for cord wicking is as follows. A yarn sample about 24 inches (61.0 cms.) in length is tied at one end to a 150 gram weight and is tied at its other end to the bottom of a basin which contains a liquid. The yarn sample is suspended over a pulley intermediate its two ends to provide a measuring surface of about 10 inches (25.4 cms.). The height (in millimeters) reached by the liquid on the yarn in one minute is the cord wicking value. Wicking is a measure of the wetting of the yarn, the higher the value the better.

Breaking strength is defined at ASTM D 885-78, Section 3.4 as "the ability or capacity of a specific material to withstand the ultimate tensile load or force required for rupture". The procedure for testing breaking strength (load) of conditioned yarns and cords is described in ASTM D 885-78, Section 15. The procedure for obtaining the elongation at break (percent) of conditioned yarns and cords is described in ASTM D 885-78, Section 18.

TABLE I

Finish Compositions - Oil Portion

| Component | Weight Percent | | | |
|---|---|---|---|---|
| | A | B | C | D |
| Coconut oil | — | — | — | 51.7 |
| Rearranged glyceride | — | 51.2 | 51.2 | — |
| POE (9)[1] oleyl ether | — | 23.3 | — | — |
| POE (10)[1] oleyl ether | — | — | 23.3 | 23.5 |
| POE (9)[1] nonyl phenol | — | 4.6 | 4.6 | 4.7 |
| POE (5)[1] castor oil | — | 14.0 | 14.0 | 14.1 |
| A-C® polyethylene 680[2] | 6.8 | 5.4 | 5.4 | 4.9 |
| A-C® polyethylene 392[3] | — | — | — | — |
| Triton X-100[4] | — | 1.4 | 1.4 | 1.0 |
| Sodium hydroxide | — | 0.1 | 0.1 | 0.1 |
| Mineral oil[5] | 48.2 | — | — | — |
| POE (7)[1] oleyl phosphate | 38.4 | — | — | — |
| NEKAL WS-25[6] | 6.6 | — | — | — |
| POE (7)[1] cetyl-stearyl alcohol phosphate | — | — | — | — |
| AEROSOL TR-70[7] | — | — | — | — |
| POE (16)[1] hydrogenated castor oil | — | — | — | — |

| Component | Weight Percent | | | |
|---|---|---|---|---|
| | E | F | G | H |
| Coconut oil | 51.7 | 55 | — | — |
| Rearranged glyceride | — | — | 50.8 | 50 |
| POE (9)[1] oleyl ether | — | — | — | — |
| POE (10)[1] oleyl ether | 23.5 | 25 | 23.1 | — |
| POE (9)[1] nonyl phenol | 4.7 | 5 | 4.6 | — |
| POE (5)[1] castor oil | 14.1 | 15 | 13.8 | — |
| A-C® polyethylene 680[2] | — | — | — | — |
| A-C® polyethylene 392[3] | 4.9 | — | 5.9 | — |
| Triton X-100[4] | 1.0 | — | 1.7 | — |
| Sodium hydroxide | 0.1 | — | 0.1 | — |
| Mineral oil[5] | — | — | — | — |
| POE (7)[1] oleyl phosphate | — | — | — | — |
| NEKAL WS-25[6] | — | — | — | — |
| POE (7)[1] cetyl-stearyl alcohol phosphate | — | — | — | 30 |
| AEROSOL TR-70[7] | — | — | — | 3.0 |
| POE (16)[1] hydrogenated castor oil | — | — | — | 17 |

Footnotes to Table I
[1] Moles of ethylene oxide per mole of base material.
[2] Allied Chemical Corporation's trade name for an oxidized polyethylene having an acid number of about 14 to 18 and a softening point of about 105° to 110° C.
[3] Allied Chemical Corporation's trade name for an oxidized polyethylene having an acid number of about 28 to 32 and a softening point of about 138° to 142° C.
[4] Rohm & Haas Company's trade name for polyoxyethylene 9–10 octyl phenol.
[5] White mineral oil having a viscosity of about 100 S.U.S. at 100° F. (37.8° C.) and a boiling point of about 297° to 458° C. (568° to 855° F.).
[6] GAF's trade name for solution consisting of 75 percent sodium dinonyl sulfosuccinate, 10 percent isopropanol and 15 percent water.
[7] American Cyanamid's trade name for a solution consisting of 70 percent sodium di(tridecyl) sulfosuccinate, 20 percent ethanol and 10 percent water.

TABLE II

| | Control | Example | | |
|---|---|---|---|---|
| | 1 | 2 | 3 | 4 |
| Spin Finish - Oil Portion | A | B | C | D |
| Biocide - Troysan 174[1] | — | 0.1 | 0.1 | 0.1 |
| Greige Cord[2]: | | | | |
| Breaking strength (lbs.) | 70.5 | 70.2 | 70.2 | 70.6 |
| Elongation at break (%) | 29.7 | 29.8 | 29.8 | 29.5 |
| Wicking (mm.) - Water | 52 | 47 | 47 | 27 |
| Wicking (mm.) - ARFL[3] | 23 | 21 | 21 | 8 |
| Wicking (mm.) - MRFL[4] | 22 | 22 | 22 | 5 |
| Treated Cord[5]: | | | | |
| Breaking strength (lbs.) | 72.2 | 73.2 | 73.2 | 72.1 |
| Elongation at break (%) | 25.3 | 25.4 | 25.4 | 25.5 |
| Adhesion - Pounds pull | 37 | 36 | 37 | 31 |
| Adhesion - Visual rating | 5.0 | 4.9 | 5.0 | 5.0 |

| | Example | | | |
|---|---|---|---|---|
| | 5 | 6 | 7 | 8 |
| Spin Finish - Oil Portion | E | F | G | H |

TABLE II-continued

| | | | | |
|---|---|---|---|---|
| Biocide - Troysan 174[1] | 0.1 | 0.1 | 0.1 | 0.1 |
| Greige Cord[2]: | | | | |
| Breaking strength (lbs.) | — | — | 71.4 | 68.5 |
| Elongation at break (%) | — | — | 27.9 | 27.0 |
| Wicking (mm.) - Water | 12 | 14 | 48 | 47 |
| Wicking (mm.) - ARFL[3] | 7 | 6 | 22 | 15 |
| Wicking (mm.) - MRFL[4] | 6 | 7 | 21 | 21 |
| Treated Cord[5]: | | | | |
| Breaking strength (lbs.) | — | — | 70.9 | 68.1 |
| Elongation at break (%) | — | — | 23.3 | 22.8 |
| Adhesion - Pounds pull | — | — | 36 | 37 |
| Adhesion - Visual rating | — | — | 5.0 | 4.8 |

Footnotes to Table II

[1]Troy Chemical Company's trade name for 2[(hydroxymethyl)amino]ethanol.

[2]Twisted cord with no further treatment such as dipping

[3]Liquid composition comprising by weight percent:

| | |
|---|---|
| Styrene butadiene vinyl pyridine latex | 20.8 |
| Resorcinol | 2.24 |
| Ammonium hydroxide | 1.96 |
| Formaldehyde | 1.16 |
| Sodium hydroxide | 0.061 |
| Water | 73.8 |
| | 100.0 |

These percentages are based on theoretical 100% concentrations of reagents. Allowance should be made in practice for the strengths commonly met, e.g., ammonium hydroxide 28%.

[4]Liquid composition similar to that of footnote 3 with the substitution of a 50/50 mixture of a vinyl pyridine latex (41.8% solids) and synthetic butyl rubber latex (39.3% solids) for the styrene butadiene vinyl pyridine latex.

[5]Twisted cord which has been treated with a standard resorcinol-formaldehyde-latex dip and processed at high temperature (200°–205° C.) in the conventional manner.

DESCRIPTION OF THE PREFERRED EMBODIMENT

The preferred embodiment of this invention may be briefly stated as follows: A spin finish, particularly for continuous filament polyamide yarn to be processed into tire cord, the finish being an oil in water emulsion of about 18 to 22 percent by weight of the oil portion, the oil portion comprising about 39 to 60 weight percent of a rearranged glyceride; about 15 to 25 weight percent of ethoxylated oleyl alcohol containing about 8 to 10 moles of ethylene oxide per mole of oleyl alcohol; about 2.5 to 5 weight percent of ethoxylated nonyl phenol containing about 5 to 10 moles of ethylene oxide per mole of nonyl phenol; about 10 to 20 weight percent of ethoxylated castor oil containing about 4 to 7 moles of ethylene oxide per mole of castor oil; about 2.5 to 6 weight percent of oxidized polyethylene having an acid number of about 14 to 18 and a softening point of about 105° to 110° C.; about 0.5 to 1.7 weight percent of ethoxylated octyl phenol containing about 9 to 10 moles of ethylene oxide per mole of octyl phenol; about 0.08 to 0.15 weight percent of sodium hydroxide; and about 0.05 to 0.15 weight percent of a biocide, specifically 2[(hydroxymethyl)amino]ethanol; the spin finish having a pH of about 9.1 to 9.4.

Formulation of the spin finish is preferably as follows. An aqueous emulsion of the oxidized polyethylene is prepared having the following composition:

| | Parts | Weight Percent |
|---|---|---|
| Oxidized polyethylene | 38 | 19 |
| POE (9-10) octyl phenol | 10 | 5 |
| 20% aqueous NaOH solution | 3 | 1.5 |
| Water | 149 | 74.5 |

The wax and the emulsifier are melted together at 125° C. (257° F.) maximum and when completely melted, are cooled to 110° C. (230° F.). With the melt temperature at 110° C. (230° F.), the sodium hydroxide solution is added with stirring to break up the foam which forms. The water is heated to boiling. The melt at 110° C. (230° F.) is slowly added with rapid stirring to the water which has been maintained at a temperature of 95° to 99° C. (203°–210° F.). The emulsion is then allowed to cool to 40°–50° C. (104°–122° F.) with moderate stirring. Water is added to replace water lost due to evaporation.

A 20 percent oil in water emulsion is formed utilizing the other spin finish components (except the biocide).

| | Parts | Weight Percent |
|---|---|---|
| Water | 80 | 80 |
| Rearranged glyceride | 11 | 11 |
| Ethoxylated oleyl ether | 5 | 5 |
| Ethoxylated nonyl phenol | 1 | 1 |
| Ethoxylated castor oil | 3 | 3 |

The oil portion and water are both heated to 60° C. (140° F.), and the oil is added to the water with agitation. The emulsion is cooled to room temperature, about 30° to 35° C. (86° to 95° F.)

The polyethylene emulsion is added to the oil in water emulsion at room temperature, about 30° to 35° C. (86° to 95° F.), at a ratio or weight percent of about 5.75 to 94.25. About 0.1 weight percent of the biocide is added to the emulsion. This spin finish has its oil portion identified as B in Table I.

The invention will now be further described in the following specific examples which are to be regarded solely as illustrative and not as restricting the scope of the invention. In the following examples, parts and percentages employed are by weight unless otherwise indicated.

EXAMPLE 1

Polycaproamide pellets having a relative viscosity of about 85 as determined at a concentration of 11 grams of polymer in 100 ml. of 90 percent formic acid at 25° C. (ASTM D-789-62T) and having about 70 total end groups were melt extruded at a temperature of about 275° C. and at a rate of about 50 pounds per hour and under pressure of about 2800 psig. through a 204-orifice spinnerette to produce an undrawn yarn having about 5590 denier. The yarn was quenched utilizing the apparatus of U.S. Pat. No. 3,619,452 to Harrison et al., hereby incorporated by reference. A 20 percent oil in water emulsion was formed utilizing oil portion A of Table I. This finish composition was applied to the yarn as a spin finish in amount to provide about 0.01 to 2.0 weight percent, based on the weight of the yarn, of oxidized polyethylene on the yarn. The yarn was then heated and drawn over a ceramic pin on a conventional drawtwist machine to about 5 times its extruded length to produce a 1260 denier yarn. The drawtwister heater was at a temperature of about 190° C. During the drawing of this control yarn, offensive smoke and fumes were given off.

The control yarn was twisted into three-ply cords and prepared for tire application by treatment with a standard resorcinol-formaldehyde latex dip and processing at high temperature (200° to 205° C.) in the conventional manner. The twisted cord was tested before (greige cord) and after treatment for the properties set forth in Table II.

EXAMPLES 2–8

The procedure of Example 1 was repeated for Examples 2 through 8 except that the oil portions B through H respectively, described in Table I, were utilized in forming the spin finish. Table II sets forth properties for twisted cords made from yarn produced in each example.

The spin finishes utilizing oil portions B and C of Table I were formulated in accordance with the description of the preferred embodiment. Spin finishes utilizing oil portions D and E of Table I were similarly formulated except that the aqueous emulsion of the oxidized polyethylene had the following composition:

|  | Parts | Weight Percent |
| --- | --- | --- |
| Oxidized polyethylene | 50 | 25 |
| POE (9–10) octyl phenol | 10 | 5 |
| 20% aqueous NaOH solution | 3 | 1.5 |
| Water | 137 | 68.5 |

Also, the polyethylene emulsion was added to the oil in water emulsion at a ratio or weight percent of about 4 to 96. The spin finish utilizing oil portion G of Table I was similarly formulated except that the aqueous emulsion of the oxidized polyethylene had the following composition:

|  | Parts | Weight Percent |
| --- | --- | --- |
| Oxidized polyethylene | 34 | 17 |
| POE (9–10) octyl phenol | 10 | 5 |
| 20% aqueous NaOH solution | 3 | 1.5 |
| Water | 153 | 76.5 |

Also, the polyethylene emulsion was added to the oil in water emulsion at a ratio or weight percent of about 7 to 93. The remaining spin finishes, i.e., those utilizing oil portions F and H of Table I (Examples 6 and 8), were 20 percent oil in water emulsions formulated by heating the oil and water separately to 60° C. (140° F.) and adding the oil to the water with agitation.

DISCUSSION

With reference to Table II, the values for the properties set forth for the control (Example 1) were the target values for a superior, nonfuming spin finish. The spin finishes of Examples 4, 5 and 6 had extremely low cord wicking values, apparently independent of the presence or lack of an oxidized polyethylene; note, however, that the oil portions of those spin finishes, i.e., D, E and F respectively, included coconut oil rather than the rearranged glyceride as its lubricant. Also, the spin finish of Example 8, which did not include an oxidized polyethylene, had very low breaking strength values; note, however, that oil portion H of this spin finish included the rearranged glyceride rather than coconut oil as its lubricant. It is apparently important, therefore, that both an oxidized polyethylene and the rearranged glyceride be components of the desired spin finish. Examples 2, 3 and 7 (Table II) are the nonfuming spin finishes forming a part of the present invention. In this regard, the spin finishes of Examples 2 and 3, which include an oxidized polyethylene having an acid number of about 14 to 18 and a softening point of about 105° to 110° C., are preferred to that of Example 7, which includes an oxidized polyethylene having an acid number of about 28 to 32 and a softening point of about 138° to 142° C.; this is due to the fact that on occasion the oxidized polyethylene of the latter spin finish deposits on the processing equipment and plates out.

What is claimed is:

1. A spin finish for application to polyamide yarn, the spin finish having a pH of about 7 to 12 and being an oil in water emulsion, the oil portion of which comprises: about 24.7 to 65 weight percent of a rearranged glyceride, about 5 to 30 weight percent of ethoxylated oleyl alcohol, about 1 to 10 weight percent of ethoxylated nonyl phenol, about 5 to 30 weight percent of ethoxylated castor oil, about 1 to 7.4 weight percent of an oxidized polyethylene, about 0.2 to 2.0 weight percent of a non-nitrogen nonionic emulsifier for the oxidized polyethylene, and about 0.04 to 0.3 weight percent of an alkali hydroxide; wherein said rearranged glyceride is a triglyceride rich in $C_{18}$ unsaturated oleic acid chain, formed by alcoholysis using oleyl alcohol in the presence of an acid catalyst or transesterification of coconut oil with glycerol trioleate.

2. The spin finish of claim 1 wherein the oil portion further comprises an effective amount of a biocide.

3. The spin finish of claim 1 wherein the oxidized polyethylene has an acid number of about 14 to 32 and a softening point of about 100° to 142° C.

4. The spin finish of claim 3 wherein the oxidized polyethylene has an acid number of about 14 to 18 and a softening point of about 105° to 110° C.

5. The spin finish of claim 1 wherein the emulsifier is an ethoxylated alkyl phenol.

6. The spin finish of claim 5 wherein the emulsifier is ethoxylated octyl phenol.

7. The spin finish of claim 1 wherein the alkali hydroxide is sodium hydroxide.

8. The spin finish of claim 1 wherein the alkali hydroxide is potassium hydroxide.

9. The spin finish of claim 1 wherein the alkali hydroxide is ammonium hydroxide.

10. The spin finish of claim 1 wherein the oil portion comprises about 10 to 35 weight percent of the spin finish.

11. The spin finish of claim 1 wherein the pH of the spin finish is about 7.3 to 9.7.

12. The spin finish of claim 1 wherein the ethoxylated oleyl alcohol contains about 6 to 12 moles of ethylene oxide per mole of oleyl alcohol, the ethoxylated nonyl phenol contains about 2 to 12 moles of ethylene oxide per mole of nonyl phenol, and the ethoxylated castor oil contains about 2 to 16 moles of ethylene oxide per mole of castor oil.

13. The spin finish of claim 12 wherein the ethoxylated oleyl alcohol contains about 8 to 10 moles of ethylene oxide per mole of oleyl alcohol, the ethoxylated nonyl phenol contains about 5 to 10 moles of ethylene oxide per mole of nonyl phenol, and the ethoxylated castor oil contains about 4 to 7 moles of ethylene oxide per mole of castor oil.

14. The spin finish of claim 1 wherein the oil portion of the spin finish comprises: about 39 to 60 weight percent of the rearranged glyceride, about 15 to 25 weight percent of the ethoxylated oleyl alcohol, about 2.5 to 5 weight percent of ethoxylated nonyl phenol, about 10 to 20 weight percent of ethoxylated castor oil, about 2.5 to 6 weight percent of the oxidized polyethylene, about 0.5 to 1.7 weight percent of the emulsifier for the oxidized polyethylene, and about 0.08 to 0.15 weight percent of the alkali hydroxide.

15. The spin finish of claim 14 wherein the oil portion further comprises an effective amount of a biocide.

16. The spin finish of claim 15 wherein the biocide comprises about 0.02 to 0.5 weight percent of the spin finish.

17. The spin finish of claim 16 wherein the biocide forms about 0.05 to 0.15 weight percent of the spin finish.

18. The spin finish of claim 17 wherein the biocide is 2[(hydroxymethyl)amino]ethanol.

19. The spin finish of claim 14 wherein the oxidized polyethylene has an acid number of about 14 to 32 and a softening point of about 100° to 142° C.

20. The spin finish of claim 19 wherein the oxidized polyethylene has an acid number of about 14 to 18 and a softening point of about 105° to 110° C.

21. The spin finish of claim 14 wherein the emulsifier is an ethoxylated alkyl phenol.

22. The spin finish of claim 21 wherein the emulsifier is ethoxylated octyl phenol.

23. The spin finish of claim 22 wherein the ethoxylated octyl phenol contains about 8 to 12 moles of ethylene oxide per mole of octyl phenol.

24. The spin finish of claim 23 wherein the ethoxylated octyl phenol contains about 9 to 10 moles of ethylene oxide per mole of octyl phenol.

25. The spin finish of claim 14 wherein the alkali hydroxide is sodium hydroxide.

26. The spin finish of claim 14 wherein the alkali hydroxide is potassium hydroxide.

27. The spin finish of claim 14 wherein the alkali hydroxide is ammonium hydroxide.

28. The spin finish of claim 14 wherein the oil portion comprises about 10 to 35 weight percent of the spin finish.

29. The spin finish of claim 28 wherein the oil portion comprises about 18 to 22 weight percent of the spin finish.

30. The spin finish of claim 14 wherein the pH of the spin finish is about 7.3 to 9.7.

31. The spin finish of claim 30 wherein the pH of the spin finish is about 9.1 to 9.4.

32. The spin finish of claim 14 wherein the ethoxylated oleyl alcohol contains about 8 to 10 moles of ethylene oxide per mole of oleyl alcohol, the ethoxylated nonyl phenol contains about 5 to 10 moles of ethylene oxide per mole of nonyl phenol, the ethoxylated castor oil contains about 4 to 7 moles of ethylene oxide per mole of castor oil, the oxidized polyethylene has an acid number of about 14 to 32 and a softening point of about 100° C. to 142° C., the emulsifier is ethoxylated octyl phenol containing about 9 to 10 moles of ethylene oxide per mole of octyl phenol, the alkali hydroxide is sodium hydroxide, the spin finish further comprises about 0.05 to 0.15 weight percent of a biocide, and wherein the spin finish has a pH of about 9.1 to 9.4.

33. A polyamide yarn having incorporated therewith the spin finish of claim 32.

34. A polyamide yarn having incorporated therewith the spin finish of claim 1.

35. The polyamide yarn of claim 34 wherein about 0.01 to 2.0 weight percent, based on the weight of the yarn, of the oxidized polyethylene is retained on the yarn.

36. The polyamide yarn of claim 35 wherein the ethoxylated oleyl alcohol contains about 6 to 12 moles of ethylene oxide per mole of oleyl alcohol, the ethoxylated nonyl phenol contains about 2 to 12 moles of ethylene oxide per mole of nonyl phenol, and the ethoxylated castor oil contains about 2 to 16 moles of ethylene oxide per mole of castor oil.

37. The polyamide yarn of claim 34 wherein the oil portion further comprises a biocide.

38. In a process for the production of polyamide yarn the improvement which comprises treating the yarn during spinning with a spin finish, the spin finish having a pH of about 7 to 12 and being an oil in water emulsion, the oil portion of which comprises:
about 24.7 to 65 weight percent of a rearranged glyceride, about 5 to 30 weight percent of ethoxylated oleyl alcohol, about 1 to 10 weight percent of ethoxylated nonyl phenol, about 5 to 30 weight percent of ethoxylated castor oil, about 1 to 7.4 weight percent of an oxidized polyethylene, about 0.2 to 2.0 weight percent of a non-nitrogen nonionic emulsifier for the oxidized polyethylene, and about 0.04 to 0.3 weight percent of an alkali hydroxide; wherein said rearranged glyceride is a triglyceride rich in $C_{18}$ unsaturated oleic acid chain, formed by alcoholysis using oleyl alcohol in the presence of an acid catalyst or transesterification of coconut oil with glycerol trioleate.

39. The process of claim 38 wherein the oil portion further comprises an effective amount of a biocide.

40. The process of claim 39 wherein the biocide is 2[(hydroxymethyl)amino]ethanol.

41. The process of claim 38 wherein the oxidized polyethylene has an acid number of about 14 to 32 and a softening point of about 100° to 142° C.

42. The process of claim 38 wherein the emulsifier is an ethoxylated alkyl phenol.

43. The process of claim 42 wherein the emulsifier is ethoxylated octyl phenol.

44. The process of claim 38 wherein the alkali hydroxide is sodium hydroxide.

45. The process of claim 38 wherein the alkali hydroxide is potassium hydroxide.

46. The process of claim 38 wherein the alkali hydroxide is ammonium hydroxide.

47. The process of claim 38 wherein the oil portion comprises about 10 to 35 weight percent of the spin finish.

48. The process of claim 38 wherein the pH of the spin finish is about 7.3 to 9.7.

49. The process of claim 47 wherein the oil portion consists essentially of about 39 to 60 weight percent of the rearranged glyceride, about 15 to 25 weight percent of ethoxylated oleyl alcohol containing about 8 to 10 moles of ethylene oxide per mole of oleyl alcohol, about 2.5 to 5 weight percent of ethoxylated nonyl phenol containing about 5 to 10 moles of ethylene oxide per mole of nonyl phenol, about 10 to 20 weight percent of ethoxylated castor oil containing about 4 to 7 moles of ethylene oxide per mole of castor oil, about 2.5 to 6 weight percent of an oxidized polyethylene having an acid number of about 14 to 18 and a softening point of about 105° to 110° C., about 0.5 to 1.7 weight percent of ethoxylated octyl phenol containing about 9 to 10 moles of ethylene oxide per mole of octyl phenol, about 0.08 to 0.15 weight percent of sodium hydroxide, and about 0.05 to 0.15 weight percent of a biocide, and wherein the spin finish has a pH of about 9.1 to 9.4.

* * * * *